US012120606B2

(12) United States Patent
Liu et al.

(10) Patent No.: US 12,120,606 B2
(45) Date of Patent: Oct. 15, 2024

(54) DISCONTINUOUS RECEPTION (DRX) CONFIGURATION FOR AUTOMATIC NEIGHBOR RELATION (ANR)

(71) Applicant: ZTE Corporation, Guangdong (CN)

(72) Inventors: Jing Liu, Guangdong (CN); He Huang, Guangdong (CN); Xiaojuan Shi, Guangdong (CN)

(73) Assignee: ZTE Corporation, Shenzhen (CN)

( * ) Notice: Subject to any disclaimer, the term of this patent is extended or adjusted under 35 U.S.C. 154(b) by 322 days.

(21) Appl. No.: 17/589,302

(22) Filed: Jan. 31, 2022

(65) Prior Publication Data

US 2022/0159566 A1 May 19, 2022

Related U.S. Application Data

(63) Continuation of application No. PCT/CN2019/098624, filed on Jul. 31, 2019.

(51) Int. Cl.
*H04W 52/02* (2009.01)
*H04W 72/21* (2023.01)
*H04W 76/28* (2018.01)

(52) U.S. Cl.
CPC ....... *H04W 52/0203* (2013.01); *H04W 72/21* (2023.01); *H04W 76/28* (2018.02)

(58) Field of Classification Search
CPC ..... H04W 76/28; H04W 72/21; H04W 72/20; H04W 52/0203
See application file for complete search history.

(56) References Cited

U.S. PATENT DOCUMENTS 9,264,954 B2    2/2016   Radulesu et al.
11,284,469 B2   3/2022   Bergstrom et al.
2015/0215912 A1* 7/2015  Jha .................. H04L 5/0091
                                                    370/311

(Continued)

FOREIGN PATENT DOCUMENTS

CN    102932822 A    2/2013
CN    104780571 A    7/2015

(Continued)

OTHER PUBLICATIONS

European Search Report for EP Patent Application No. 199398835, dated on Jul. 13, 2022 (14 pages).

(Continued)

*Primary Examiner* — Jeong S Park
(74) *Attorney, Agent, or Firm* — Perkins Coie LLP

(57) ABSTRACT

Methods, systems, and devices related to digital wireless communication, and more specifically, to techniques related to coordinating DRX for ANR. In one exemplary aspect, a method for wireless communication may include a first network node transmitting a request message to a second network node requesting a discontinuous reception configuration associated with the second network node. In another exemplary aspect, a method for wireless communication includes a first network node transmitting a request message to a second network node, the request message indicating a request to trigger a global cell identification report of a terminal and including information relating to a target cell used for measuring the global cell identification report.

18 Claims, 9 Drawing Sheets

(56) References Cited

U.S. PATENT DOCUMENTS

| | | | |
|---|---|---|---|
| 2015/0327280 A1* | 11/2015 | Zhang | H04W 72/541 |
| | | | 370/336 |
| 2016/0081020 A1 | 3/2016 | Rahman et al. | |
| 2017/0019820 A1* | 1/2017 | Das | H04W 48/20 |
| 2017/0156176 A1* | 6/2017 | Bergquist | H04W 8/22 |
| 2017/0367045 A1* | 12/2017 | Rahman | H04W 76/15 |
| 2019/0174366 A1 | 6/2019 | Susitaival et al. | |
| 2020/0413460 A1* | 12/2020 | Tang | H04W 36/0061 |
| 2021/0297842 A1* | 9/2021 | Shrivastava | H04W 28/24 |
| 2022/0141728 A1* | 5/2022 | Takahashi | H04W 76/15 |
| | | | 370/331 |

FOREIGN PATENT DOCUMENTS

| | | |
|---|---|---|
| CN | 107743715 A | 2/2018 |
| CN | 109565380 A | 4/2019 |
| CN | 109804705 A | 5/2019 |
| EP | 2106189 A1 | 9/2009 |
| EP | 3402302 A1 | 11/2018 |
| EP | 3308501 B1 | 5/2020 |
| WO | 2014/059663 A1 | 4/2014 |
| WO | 2016184500 A1 | 11/2016 |

OTHER PUBLICATIONS

Ericsson, "Measurement co-ordination, remaining aspects (TP to 38.331)," 3GPP TSG-RAN WG2 #102, R2-1807047, Busan, South Korea, May 21-25, 2018, 7 pages.

ZTE Corporation et al., "Consideration on DRX coordination in ANR," 3GPP TSG-RAN W62 Meeting #107bis, R2-1912769, Chongqing, China, Oct. 14-18, 2019, 6 pages.

Huawei et al., "Consideration on DRX for EN-DC," 3GPP TSG-RAN WG2 Meeting #99, R2-1708958, Benin, Germany, Aug. 21-25, 2017, 2 pages.

Intel Corporation, "DRX Configuration Alignment in Dual Connectivity," 3GPP TSG RAN WG2 Meeting #87bis, R2-144140, Shanghai, China, Oct. 6-10, 2014, 3 pages.

International Search Report and Written Opinion mailed on Apr. 24, 2020 for International Application No. PCT/CN2019/098624, filed on Jul. 31, 2019 (7 pages).

3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2," 3GPP TS 36.300 V14.0.0, 314 pages, Sep. 2016.

Singapore Written Opinion for SG Patent Application No. 11202200954P, dated on Jan. 23, 2024, 9 pages.

Indonesian office action issued in ID Patent Application No. P00202203256, dated May 30, 2024, 8 pages. English translation included.

Chinese office action issued in CN Patent Application No. 202210580287.4, dated May 23, 2024, 12 pages. English translation included.

Ericsson, "Constants for multiplicity and type & reference ranges in TS 25.331," TSG-RAN Working Group 2 (Radio layer 2 and Radio layer 3), TSGR2#13(00)001009, R2-001009, Oahu, Hawaii, May 22-26, 2000, 336 pages.

NTT DOCOMO, Inc. et al., "Clarification on PDCCH monitoring during DRX mode," 3GPP TSG-RAN2 Meeting #101, R2-1803681, Athens, Greece, Feb. 26-Mar. 2, 2018, 9 pages.

* cited by examiner

DISCONTINUOUS RECEPTION (DRX) CONFIGURATION FOR AUTOMATIC NEIGHBOR RELATION (ANR)

CROSS-REFERENCE TO RELATED APPLICATIONS

This application is a continuation of International Patent Application No. PCT/CN2019/098624, filed on Jul. 31, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to coordinating DRX for ANR.

In one exemplary aspect, a method for wireless communication includes a first network node transmitting a request message to a second network node requesting a discontinuous reception configuration associated with the second network node.

In another exemplary aspect, a method for wireless communication includes a first network node transmitting a request message to a second network node, the request message indicating a request to trigger a global cell identification report of a terminal and including information relating to a target cell used for measuring the global cell identification report.

In another exemplary aspect, a method for wireless communication includes a first network node receiving a measurement report from a terminal including a global cell identifier report. The method also includes the first network node transmitting a request message to a second network node that includes a discontinuous reception switch indicator that is set to a false value indicating that a discontinuous reception configuration associated with the second network node is not needed based on receiving the measurement report from the terminal.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

Some embodiments may preferably implement the following solutions, written in a clause-format.

1. A method for wireless communication, comprising: transmitting, by a first network node, a request message to a second network node requesting a discontinuous reception configuration associated with the second network node.

2. The solution of clause 1, wherein the request message includes a first indicator relating to a discontinuous reception switching mode associated with the second network node.

3. The solution of clause 1, wherein the request message includes a second indicator relating to an alignment of the discontinuous reception configuration associated with the second network node and a discontinuous reception configuration associated with the first network node.

4. The solution of clause 1, wherein the request message includes a timing difference including a system frame number and a frame difference between a primary cell of a primary group of cells and a primary cell of a secondary group of cells.

5. The solution of clause 1, further comprising: determining, by the first network node, that the first network node is to request the discontinuous reception configuration associated with the second network node from the second network node.

6. The solution of clause 1, wherein the discontinuous reception configuration associated with the second network node includes a long discontinuous reception cycle.

7. The solution of clause 3, wherein the second indicator indicates that the discontinuous reception configuration associated with the second network node is strictly aligned with the discontinuous reception associated with the first network node, indicating that a cycle length of the discontinuous reception configuration associated with the second network node matches a cycle length of the discontinuous reception associated with the first network node and a period of an on duration of the discontinuous reception configuration associated with the second network node is included within a period of an on duration of the discontinuous reception associated with the first network node.

8. The solution of clause 3, wherein the second indicator indicates that the discontinuous reception configuration associated with the second network node is aligned with the discontinuous reception associated with the first network node indicating that a long common idle period is provided between the discontinuous reception configuration associated with the second network node and the discontinuous reception associated with the first network node.

9. The solution of clause 3, wherein the second indicator indicates that the discontinuous reception configuration configured by the second network node includes no alignment with a discontinuous reception associated with a primary group of cells.

10. The solution of clause 1, wherein the second network node determines whether the second network node is capable of generating the discontinuous reception configuration associated with the second network node and determine whether the second network node is capable of refraining from data scheduling according to the discontinuous reception configuration associated with the second network node.

11. A solution for wireless communication, comprising: transmitting, by a first network node, a request message to a second network node, the request message indicating a request to trigger a global cell identification report of a terminal and including information relating to a target cell used for measuring the global cell identification report.

12. The solution of clause 11, further comprising: determining, by the first network node, that the first network node is to trigger the global cell identification report of the terminal.

13. The solution of clause 11, wherein the information relating to the target cell includes frequency information of a target cell.

14. The solution of clause 11, wherein the information relating to the target cell includes synchronization signal block (SSB) measurement timing control information of the target cell.

15. The solution of clause 11, wherein the information relating to the target cell includes a radio access technology (RAT) indication of the target cell.

16. The solution of clause 15, wherein the RAT indication of the target cell includes any of a global system for mobile communications (GSM) enhanced data rates for GSM evolution (EDGE) radio access network (GERAN), a universal terrestrial radio access network (UTRAN), a code division multiple access (CDMA), a new radio access with a first frequency range (NR FR1), and a new radio access with a second frequency range (NR FR2).

17. The solution of clause 11, wherein the request message includes information identifying a discontinuous reception alignment indicator.

18. The solution of clause 11, wherein the second network node to determine whether the second network node is necessary and is capable of generating a discontinuous reception configuration associated with a second network node.

19. The solution of any of clauses 1 and 18, further comprising: receiving, by the first network node, a response message from the second network node, the response message including the discontinuous reception configuration associated with the second network node indicating that the second network node is capable of generating the discontinuous reception configuration associated with the second network node.

20. The solution of any of clauses 1 and 18, further comprising: receiving, by the first network node, a rejection message from the second network node, the rejection message indicating a failure cause representing that the second network node is not capable of generating the discontinuous reception configuration associated with the second network node.

21. The solution of clause 20, further comprising: aborting, by the first network node, a global cell identification report measurement attempt based on receiving the rejection message from the second network node.

22. A solution for wireless communication, comprising: receiving, by a first network node, a measurement report from a terminal including a global cell identifier report; and transmitting, by the first network node, a request message to a second network node that includes a discontinuous reception switch indicator that is set to a false value indicating that a discontinuous reception configuration associated with the second network node is not needed based on receiving the measurement report from the terminal.

23. The solution of clause 22, wherein the second network node is configured to determine to any of release or modify the discontinuous reception configuration associated with the second network node based on receiving the request message.

The details of one or more implementations are set forth in the accompanying attachments, the drawings, and the description below. Other features will be apparent from the description and drawings, and from the claims.

DETAILED DESCRIPTION

Figure 1:
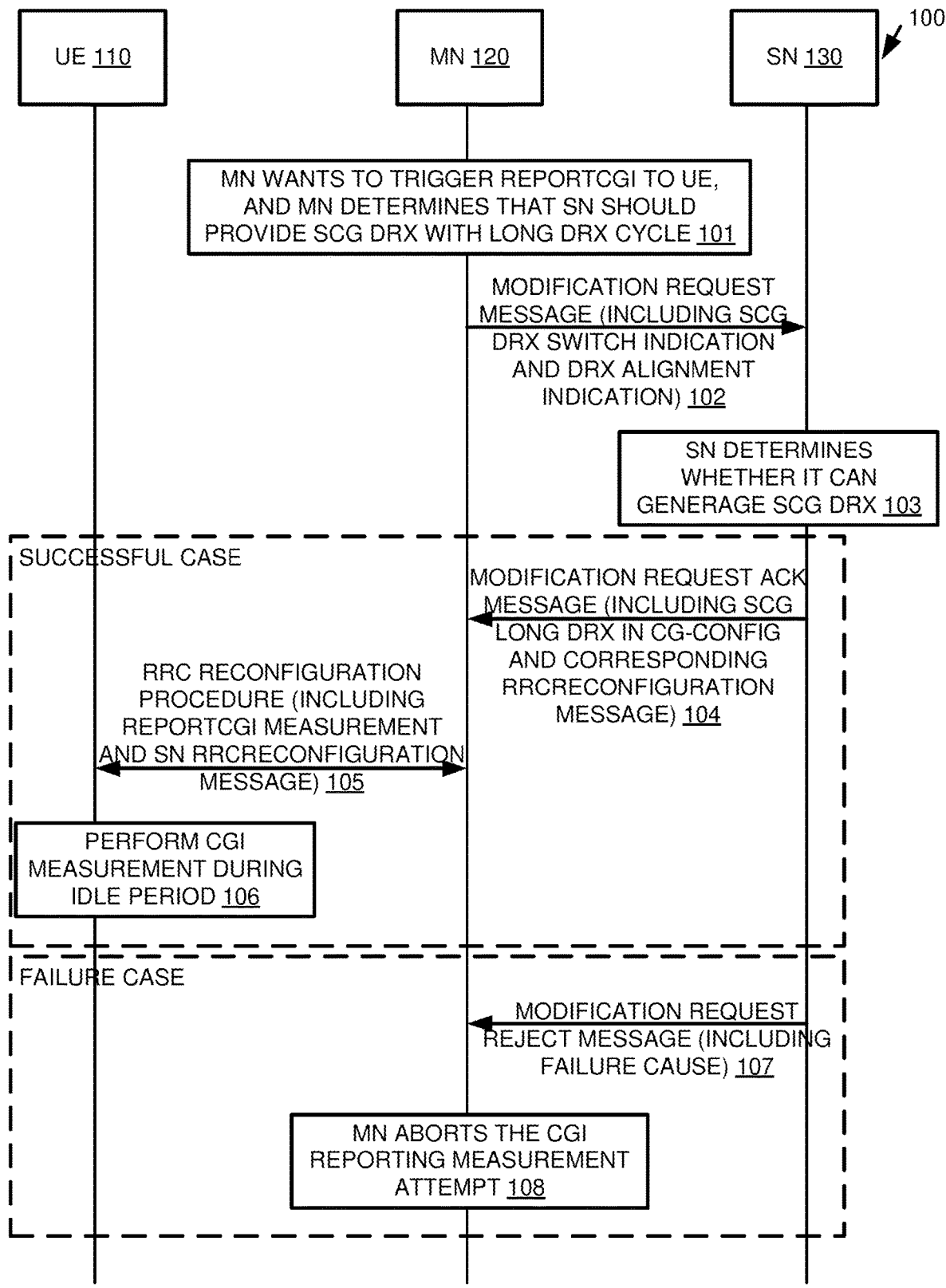
FIG. 1 illustrates an example signaling process to coordinate DRX between nodes, according to a first exemplary embodiment.

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

Overview

In cellular mobile communication systems, Automatic Neighbor Relation (ANR) function may be defined to relive the operator from the burden of manually managing neighbor relations. In 5G NR systems, the procedure of ANR function may primarily include the following steps:

As a first step, a UE may send a measurement report to serving Cell A, where the report may include a Physical Cell Identifier (PCI) information of neighbor Cell B, and cell B's NR Cell Global Identifier (NCGI) may be not included;

As a second step, because Cell B's PCI may not be in Cell A's neighbor cell relation, or there may include multiple records in Cell A's neighbor cell relation have the same PCI and corresponding frequency, Cell A may request the UE to read the NCGI of Cell B by configuring an ANR measurement (e.g. CGI reporting) to the UE.

As a third step, upon receiving this measurement configuration, the UE may attempt to read the system information of the indicated target Cell B and obtain the NCGI as well as a Tracking Area Code (TAC) and PLMN IDs information. This information may be delivered to Cell A by sending the measurement report to Cell A.

In the third step, to facilitate the UE to read the system information of target cell from a broadcast channel, UE may be expected to be provided sufficient idle period. Otherwise, this third step may fail. For providing a sufficient idle period, in LTE systems, it may be achieved by any of two methods:

In a first method, a source network may configure a Discontinuous Reception (DRX) configuration to the UE. The corresponding DRX cycle length may need to be long enough, and network can refrain data transmission and reception according to the DRX configuration such that the UE has a sufficient idle period.

In a second method, the UE may generate an autonomous gap during a serving cell scheduling period, and the UE may return its RF chain to search a target cell during the autonomous gap occasions. A potential drawback is that UE may miss some opportunities of ACK/NACK transmission.

In many cases, only the first method may be supported in some NR systems. Accordingly, to improve the success rate of target NCGI reporting, the network may be responsible for providing long cycle DRX configuration to UE and refrain from data transmission and reception in DRX idle period.

In a Multi-Radio Dual Connectivity (MR-DC) scenario, the UE can be configured to connect two nodes, where one node may act as a Master Node (MN) and the other may act as a Secondary Node (SN). The MN and SN can belong to the same RAT (e.g. NR-DC), or they can belong to different RATs (e.g. EN-DC, NE-DC, NGEN-DC). For MR-DC UEs, both MN and SN can trigger ANR measurements (e.g. conduct UE to read the NCGI information of target cell). However, it may be unclear which node (e.g. MN or SN or both) is responsible for providing the long DRX configuration to UE during ANR measurement.

For example, a EN-DC UE may be connected to both an LTE node (acts as MN) and a NR node (acts as SN). If the MN wants to configure ANR CGI reporting measurement to UE, the MN may ask the UE to read the NCGI of a target NR cell. In this case, if only the MN has provided a DRX configuration with long cycle to UE, it may be possible that the UE may fail to read the target NCGI, because the UE with specific capability may only be able to perform a ANR CGI reporting measurement when both MN leg and SN leg are spared. Accordingly, if the network wants to configure ANR CGI reporting measurement to UE, both MN and SN may have to configure DRX configuration to UE, and the DRX configurations from MN and SN may provide a sufficient common idle period.

In fact, different UEs may have different capabilities. Accordingly, for ANR measurement on a given frequency, the DRX requirement could be various among those UEs (e.g. some require MCG DRX, some require SCG DRX, and some require both MCG DRX and SCG DRX). However, in many cases, for MR-DC UEs, due to lack of the coordination between MN and SN, it may be difficult for MN and SN to provide suitable DRX configurations to UE when conducting the UE to perform ANR measurements. On the other hand, after UE delivering the ANR measurement report to network, the corresponding long DRX cycle may not be useful any more, then it may be reasonable to reconfigure/release the long DRX configuration to avoid undesired impact on data transmission. However, this may also require MN and SN coordination.

In addition, in many NR systems, the PSS, SSS, and PBCH are transmitted via Synchronization signal (SS) block (SSB)/PBCH, or SS/PBCH block. In time domain, one NR cell can use multiple beams for transmitting the PBCH, each beam corresponds to a specific direction. From network perspective, besides neighbor cell relation, it may be worth to know the detailed neighboring beam indexes for a given neighbor cell, thus, the source cell can optimize the measurements by asking UE to only measure the resources correlated to those neighbor beams. However, in current ANR measurement reporting, the UE may be unable to include the detected beam information. The present embodiments may provide enhanced ANR measurement reporting.

ANR Coordination Procedures Between MN and SN

For MR-DC UEs, different from LTE systems, both MN and SN can setup a signaling radio bearer towards UE, which may be referred to as SRB1 and SRB3. Accordingly, both MN and SN can deliver/receive RRC messages to/from UE. In the event SRB3 is not configured, SN can use SRB1 for delivering the SN RRC messages to UE directly.

To avoid UE's complexity, UE can be configured with one ANR CGI reporting measurement at a time, which may indicate that MN and SN cannot configure ANR CGI reporting measurement to UE simultaneously. Therefore, ANR measurement coordination may be introduced in MR-DC.

Specifically, if SN wants to configure ANR measurement to UE, the SN may first send a SN Modification Required message to MN, and SN can indicate ANR request information in this message. Optionally, SN can include the corresponding frequency and PCI of target cell. In addition, SN can also include an embedded RRC ANR measurement message container expected to be sent to UE. Upon reception of this ANR Request message, MN can determine whether UE has on-going ANR measurement configured by MN, and whether MN already has the NCGI information of the target cell. If MN already has the NCGI information, MN can reject the ANR request sent by SN, and provide the NCGI information to SN as a response. If MN does not have the NCGI information, and there is an on-going ANR measurement configured by MN, MN can also reject the ANR request sent by SN. If MN does not have the NCGI information, and UE has no on-going ANR measurement, then MN may forward the SN RRC message to UE.

When the SN sends SN Modification Required message to MN, the SN can also include the SCG DRX configuration. However, from MN's perspective, MN may be unaware whether MCG long DRX is also required, particularly when SN does not indicate the detail information (e.g. frequency) of CGI target cell. If the MN provides unsuitable MCG DRX configuration, the CGI reporting measurement may fail.

On the other hand, if MN wants to trigger ANR measurement to UE, and the UE has no on-going CGI reporting measurement. In current specifications, the MN can initiate measurement configuration to UE directly. If the MN knows that SN has to provide long DRX configuration as well, and MN can send SN Modification Request message to SN by indicating MCG DRX, but SN may not know whether it must to follow the DRX configuration or not. In addition, if only SCG long DRX is required, there may be no way to inform SN because SN is unaware of the CGI measurement configured by MN. So, if SN provide unsuitable SCG DRX configuration, the corresponding CGI reporting measurement may also fail.

Timing Difference Results Exchange Between MN and SN

For MR-DC UE, the MN serving cells may not synchronize with SN serving cells. In current specification, during SN setup, the MN can forward the timing difference results to SN. This result may represent the SFN/Frame difference between PSCell and PCell. Hence, the SN can schedule UE properly (e.g. not to schedule UE during the gap duration configured by MN). In the case the SN changes its serving cell, the SN is responsible to manage the new timing difference between new PSCell and PCell. However, MN may not be aware of this change, so after a while, MN may be unaware of the real timing difference between PSCell and PCell. Considering this timing difference is mainly used by SN, there may be no problem. However, this may cause a problem when SN triggers ANR reporting measurement, and the SN wants the MN to provide MCG DRX which aligned with SCG DRX, in this case, MN may know the exact timing difference between current PSCell and PCell for generating the MCG DRX configuration.

System Overview

This patent document describes techniques that can be implemented to coordinate DRX for ANR. In some embodiments, the MN can be a eNB, a ng-eNB, or a gNB, and the SN can be a eNB, a ng-eNB, or a gNB. For an ANR measurement triggered by a MN, a DRX can be coordinated between MN and SN.

The present embodiments may make sure the configured measurements from primary node and secondary node will not extend beyond UE's maximum capability for dual connectivity.

In a first exemplary embodiment, when a MN triggers an ANR CGI reporting measurement, the MN can determine whether SCG long DRX is required. If it is required, the MN can send indications to SN and request the SN to provide the DRX configuration. The indication may include whether SCG DRX is needed and whether the SCG DRX has to be aligned with MCG DRX.

In a second exemplary embodiment, in addition to the first exemplary embodiment, the MN can send CGI target cell information and DRX alignment indication to the SN. The SN can decide whether SCG long DRX is required or not.

In a third exemplary embodiment, the present embodiments may apply to a SN configured CGI reporting measurement. Similar to the first exemplary embodiment, SN can send indications to MN and ask the MN to provide the DRX configuration. The indication may indicate whether MCG DRX is needed, the MCG DRX has to be aligned with SCG DRX, and the timing difference result between PSCell and PCell.

In a fourth exemplary embodiment, for MR-DC UE, a first node may have configured CGI reporting measurement to UE, and the second node may have provided the long DRX configuration. In this case, the first node may receive the measurement report sent by UE. The first node can send the indication to second node and inform the second node that long DRX configuration is not needed any more. It may be up to second node whether to release or reconfigure the DRX configuration. The first node can be either MN or SN.

A fifth exemplary embodiment may relate to CGI reporting on a NR cell. Besides the CGI information included in measurement report, the UE can be configured to include detected SSB beam indexes of target cell in the measurement report.

Example Embodiment 1

FIG. 1 illustrates an example signaling process to coordinate DRX between nodes, according to a first exemplary embodiment. In step 101, for a dual connectivity UE, when the MN wants to configure an ANR CGI reporting measurement to UE, the MN may determine whether SCG long DRX is required for UE to execute the measurement. In step 102, if a SCG long DRX is needed, then the MN 120 may send a message to the SN 130. This message may include a SCG DRX switch indication representing an explicit indication used to inform SN if SCG long DRX is required.

Figure 2A:
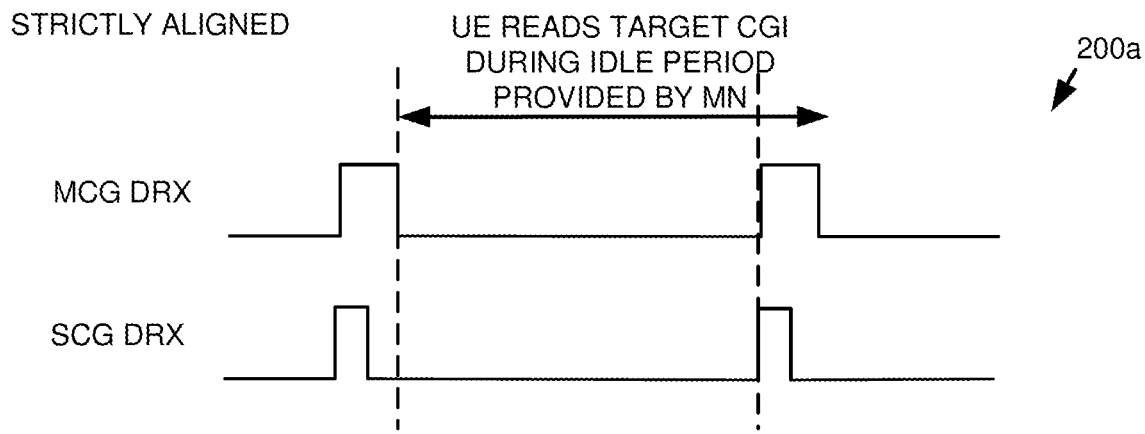
FIGS. 2A-2C illustrate example block diagrams of DRX alignment indications.
Figure 2B:
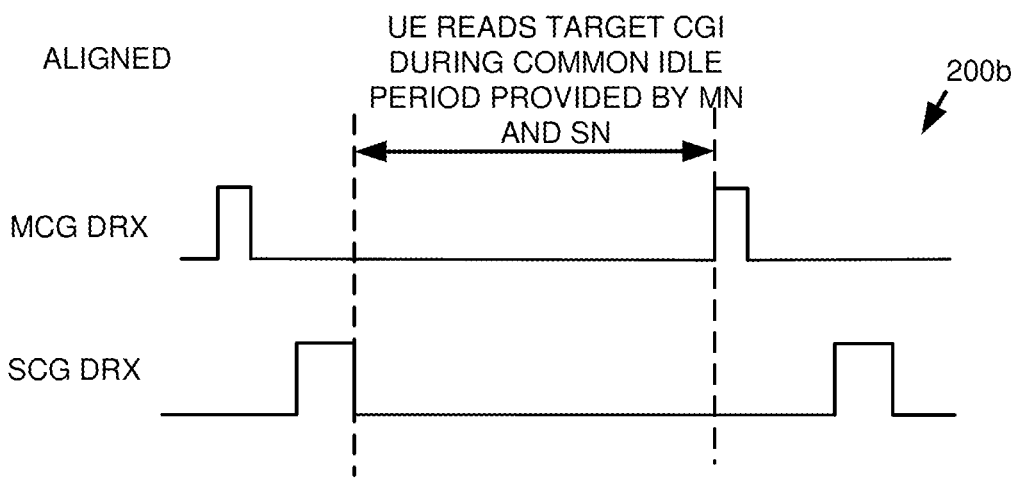
Figure 2C:
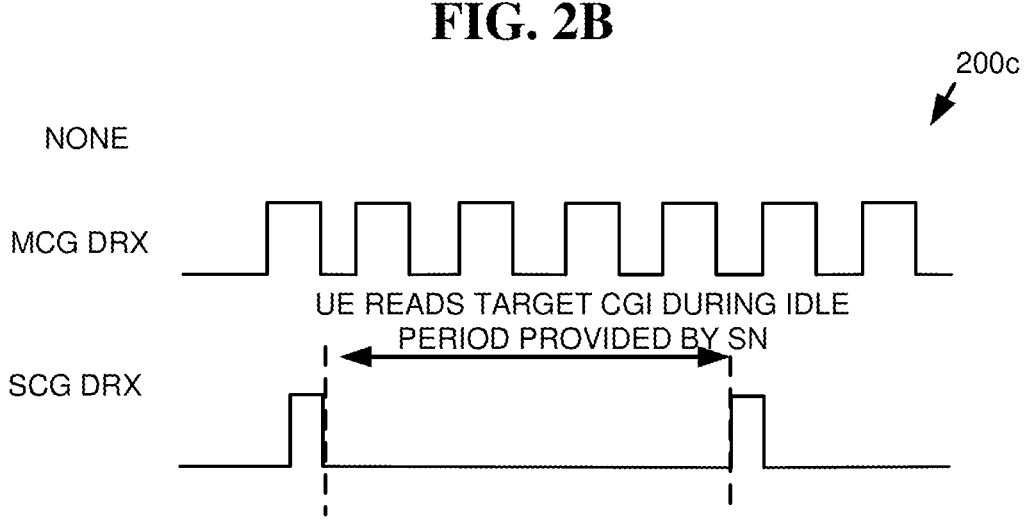

FIGS. 2A-2C illustrate example block diagrams of DRX alignment indications. The message represented in step 102 may include DRX alignment indication information, which may represent an explicit indication to inform the SN about the DRX alignment. The value range of the DRX alignment may be any of strictly aligned, aligned, or none.

For a strictly aligned DRX alignment, as shown in FIG. 2A, the SN configured DRX is strictly aligned with MCG DRX. For example, they must have the same periodicity, and from the UE perspective, the MCG DRX's 'on duration' may entirely contain the SCG DRX's 'on duration', or vice versa.

For an aligned DRX alignment, as shown in FIG. 2B, this may indicate that an SN configured DRX is aligned with a MCG DRX. For example, they can have different periodicities and different length of DRX 'on' duration. But from UE perspective, MCG DRX and SCG DRX can provide a sufficient common idle period.

For a DRX alignment that is not aligned, as shown in FIG. 2C, the SN can configure a DRX configuration irrespective of the MCG DRX configuration, so long as the SCG DRX can provide a sufficient idle period to the UE.

In some embodiments, the above parameters can be indicated in UE specific inter-node RRC message container contained in the message transmitted from MN to SN.

In step 103, the SN 130 may determine whether it can generate the required SCG DRX. Upon reception of above message, the SN may generate the corresponding SCG long DRX configuration and responds to MN 120 by sending a response message to MN.

In a successful case, in step 104, the SN 130 may transmit a modification request acknowledgement message that may include the SCG long DRX in a CG-Config inter-node RRC message and corresponding RRCReconfiguration message. In step 105, the UE and MN may initiate an RRC Reconfiguration procedure, which may include a reportCGI measurement and an SN RRCReconfiguration message. In step 106, the UE 110 may perform a CGI measurement during an idle period.

In some embodiments, the SN can indicate specific "cause" value in the modification request acknowledge message indicating the success of the procedure.

In some embodiments, MN determines whether SCG DRX is needed based on any of: the UE's measurement related capabilities, the RAT type and frequency of ANR measured target cell, and the RAT type and frequency of current serving cells in MCG and SCG. The RAT type may contain NR, or E-UTRA, or GERAN, or UTRAN, or CDMA.

In a failure case, in step 107, the SN 130 may send a modification request reject message to the MN 120 that may include a failure cause. The failure cause may indicate that the SN is unable to provide the requested configuration. In step 108, the MN 120 may abort the CGI reporting measurement attempt. In some embodiments, upon reception of the message sent from MN, if SN determines that it cannot generate the required SCG DRX, SN can respond to MN by sending a reject message to MN or sending a response message including a failure cause value to MN.

Case 1

For a EN-DC UE, the MCG serving cells may operate on LTE frequencies, and the SCG serving cells may operate on NR FR1 frequencies. The UE may support per-UE gap, but may not support per-FR gap, and the UE's ANR capability may indicate that the UE requires a common idle period (not strictly aligned) to perform the CGI reporting measurement.

If the UE has no on-going ANR CGI reporting measurement, the MN may configure a CGI reporting measurement to the UE which the target cell is a NR FR1 cell. Considering that current serving cells are either LTE or NR FR1 frequencies, and UE only supports per-UE gap. So, the MN may determine that both MN and SN has to provide long DRX configuration to UE, to facilitate the UE to perform CGI reporting on target NR FR1 cell.

The MN may send a SgNB Modification Request message to SN via an X2 interface, in order to inform SN to configure long DRX cycle to UE. This message may include an inter-node RRC message container CG-ConfigInfo. Within CG-ConfigInfo, the MN may include the MCG DRX configuration with long DRX cycle. In addition, the MN includes the parameter "SCG DRX switch indication" with value set to "True," and includes the parameter "DRX alignment indication" with value set to "Aligned."

Upon receiving SgNB Modification Request message including these parameters, the SN may determine that the MN wants to trigger ANR measurement to UE and a SCG DRX with long DRX cycle is needed, and the SCG DRX may be aligned with MCG DRX. The SN may generate the SN RRCReconfiguration message including the corresponding SCG DRX configuration. The SN can send the RRCReconfiguration message to UE via SRB3 and respond to MN the SgNB Modification Request Acknowledge message. Alternatively, the SN can send SgNB Modification Request Acknowledge message to MN including the encoded SN RRCReconfiguration message. In addition, within SgNB Modification Request Acknowledge message, the SN can indicate the corresponding SCG DRX configuration in CG-Config container.

After receiving the acknowledge message from SN, the MN may transmit the RRCConnectionReconfiguration message to the UE, including ANR CGI reporting measurement configuration, MCG long DRX configuration, and SN RRCReconfiguration message container (if received from SN). As a note, the CG-ConfigInfo may be the inter-node RRC message included in SgNB Modification Request message sent from MN to SN, and CG-Config may be the inter-node RRC message included in SgNB Modification Request Acknowledge message sent from SN to MN.

Case 2

For a NR-DC UE, the MCG serving cells may operate on NR FR1 frequencies, and the SCG serving cells may operate on NR FR2 frequencies. The UE may support both per-UE gap and per-FR gap.

If the UE has no on-going ANR CGI reporting measurement, the MN may configure a CGI reporting measurement to UE which the target cell is a NR FR2 cell. The UE supporting per-FR gap may indicate that the UE has independent RF chain for FR1 and FR2 transmission/reception. On the other hand, since SCG serving cells may be on FR2 frequencies, the MN may determine that only SN has to provide long DRX configuration to UE to facilitate the UE to do CGI reporting on target NR FR2 cell.

The MN may send an S-Node Modification Request message to SN via Xn interface in order to inform SN to configure DRX cycle to UE. This message may include an inter-node RRC message container CG-ConfigInfo. Within CG-ConfigInfo, MN may include the configured MCG DRX configuration. In addition, MN may include the parameter "SCG DRX switch indication" with value set to "True," and may include the parameter "DRX alignment indication" with value set to "None."

Upon receiving S-Node Modification Request message including these parameters, the SN may determine that MN wants to trigger ANR measurement to UE, and SCG DRX with long DRX cycle may be needed, and the SCG DRX can be provided irrespective the configuration of MCG DRX. Then, the SN may generate the SN RRCReconfiguration message including the corresponding SCG DRX configuration. The SN can send the RRCReconfiguration message to UE via SRB3 and respond to MN the S-Node Modification Request Acknowledge message. Alternatively, the SN can send S-Node Modification Request Acknowledge message to MN by including the encoded SN RRCReconfiguration message. In addition, within S-Node Modification Request Acknowledge message, the SN can indicate the corresponding SCG DRX configuration in CG-Config container.

After receiving the acknowledge message from SN, the MN may transmit the RRCReconfiguration message to UE, including the ANR CGI reporting measurement configuration, and SN RRCReconfiguration message container (if received from SN).

In some embodiments, the CG-ConfigInfo may include the inter-node RRC message included in S-Node Modification Request message sent from MN to SN. In some embodiments, CG-Config may include the inter-node RRC message included in S-Node Modification Request Acknowledge message sent from SN to MN.

Case 3

For a NR-DC UE, the MCG serving cells may operate on NR FR1 frequencies, and the SCG serving cells may operate on NR FR2 frequencies. The UE may support both per-UE gap and per-FR gap.

If the UE has no on-going ANR CGI reporting measurement, the MN may determine to configure a CGI reporting measurement to UE which the target cell is a NR FR2 cell. The UE supporting per-FR gap may indicate that the UE has independent RF chain for FR1 and FR2 transmission/reception. On the other hand, since SCG serving cells may be on FR2 frequencies, the MN may determine that only SN has to provide long DRX configuration to UE to facilitate the UE to do CGI reporting on target NR FR2 cell.

The MN may send S-Node Modification Request message to SN via Xn interface, in order to inform SN to configure DRX cycle to UE. This message may include an inter-node RRC message container CG-ConfigInfo. Within CG-ConfigInfo, MN may include the configured MCG DRX configuration. In addition, MN may include the parameter "SCG DRX switch indication" with value set to "True," and includes parameter "DRX alignment indication" with value set to "None."

Upon receiving S-Node Modification Request message including these parameters, the SN may determine that MN wants to trigger ANR measurement to UE, and SCG DRX with long DRX cycle may be needed, and the SCG DRX can be provided irrespective the configuration of MCG DRX.

However, SN may determine that it cannot fulfill the requirement. For instance, due to SN path has high data rate services, and long DRX cycle will impact the throughput. The SN may reject the modification request by sending SgNB Modification Request Reject message to MN. Moreover, SN can indicate a specific cause value in message, to inform MN that SCG failed to configure the corresponding SCG DRX.

After receiving the reject message from SN, MN may abort the CGI reporting measurement configuration procedure.

In some embodiments, the CG-ConfigInfo may include the inter-node RRC message included in S-Node Modification Request message sent from MN to SN.

Example Embodiment 2

Figure 3:
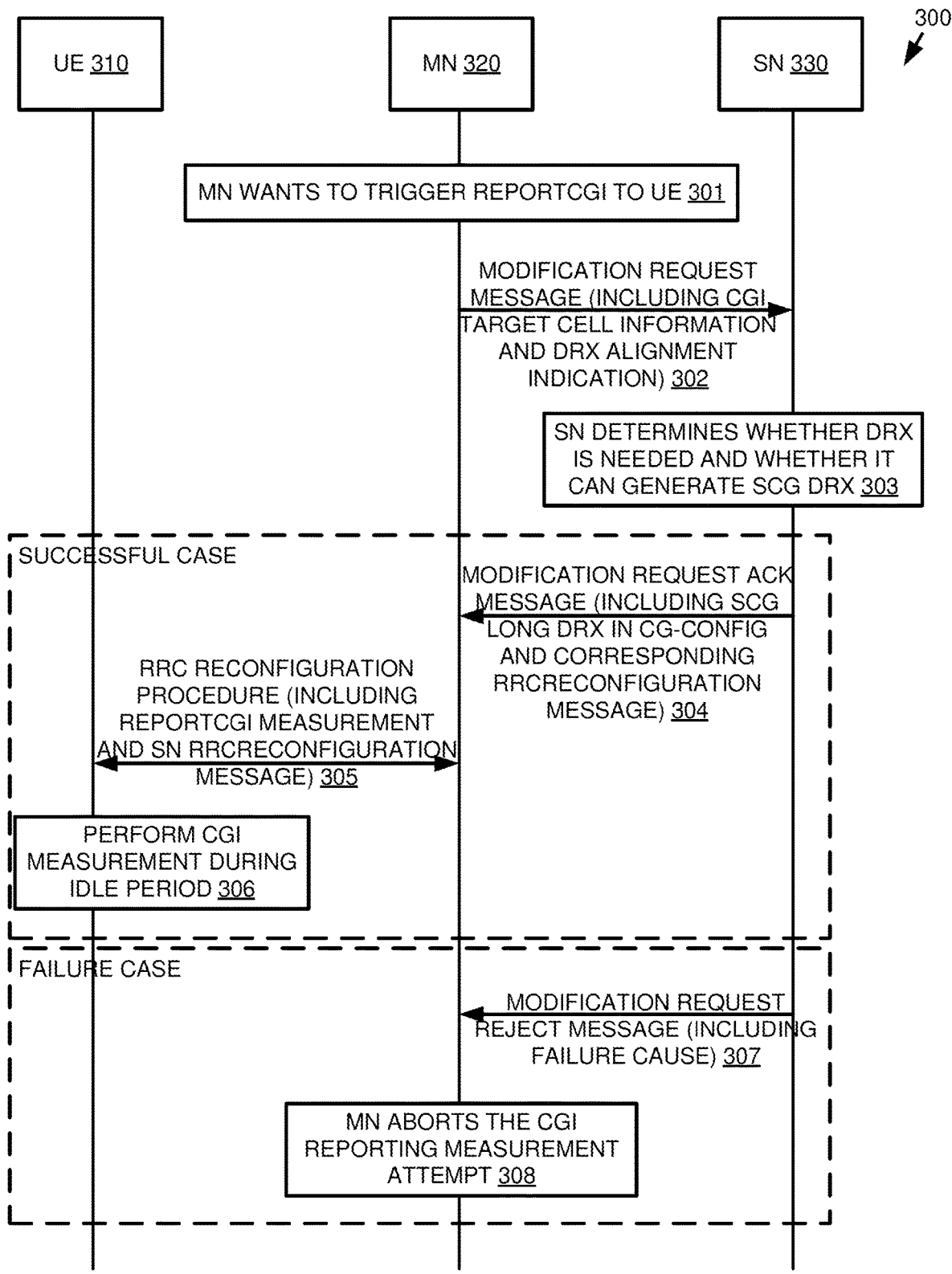
FIG. 3 illustrates an example signaling process to coordinate DRX between nodes, according to a second exemplary embodiment.

FIG. 3 illustrates an example signaling process 300 to coordinate DRX between nodes, according to a second exemplary embodiment. In step 301, the MN 320 may determine that the MN wants to trigger reportCGI to the UE 310. For a dual connectivity UE, when the MN wants to configure an ANR CGI reporting measurement to UE, the MN may send a message to SN 330 (step 302). This modification request message in step 302 may include information of CGI reporting target cell. The information of CGI reporting target cell can include a frequency of CGI reporting target cell. For LTE target cell, this may correspond to the EARFCN of target cell. For NR target cell, this may correspond to the ARFCN of the SSB of target cell. For NR target cell, it may also include the SMTC (including SSB measure periodicity, window length, window offset) configuration of the SSB.

The information of CGI reporting target cell can include RAT indication of CGI reporting target cell. The value range may include GERAN, UTRAN, CDMA, E-UTRAN, NR FR1, NR FR2.

The modification request message in step 302 may include frequency of MCG serving cells.

The modification request message in step 302 may include a DRX alignment indication representing an explicit indication to inform SN about the DRX alignment requirement. The value range can be either strictly aligned or aligned. Strictly aligned may indicate the SN configured DRX strictly aligned with MCG DRX. For example, they may have the same periodicity, and from UE perspective, the MCG DRX's 'On Duration' entirely contains the SCG DRX's 'On Duration' or vice versa. Aligned may indicate the SN configured DRX aligned with MCG DRX. For example, they can have different periodicities and different length of DRX 'On Duration'. But from UE perspective, MCG DRX and SCG DRX can provide a sufficient common idle period.

Optionally, the above parameters can be indicated in UE specific inter-node RRC message container contained in the message transmitted from MN to SN.

In step 303, the SN 330 may determine whether the DRX is needed and whether it can generate the SCG DRX. Upon reception of above message, the SN may make a decision whether SCG DRX is needed or not. In step 304, if the SN 330 determines that SCG NRX is needed, the SN 330 may send a modification request acknowledgement message to the MN 320 that may include SCG long DRX in CG-Config and corresponding RRCReconfiguration message. If SCG DRX is needed, the SN 330 may generate the SCG DRX configuration (e.g. DRX cycle length) based on the information of measured target cell and received DRX alignment indication and UE's capability.

In step 305, the MN 320 and UE 310 may initiate an RRC reconfiguration procedure that includes a ReportCGI measurement and an SN RRCReconfiguration message. In step 306, the UE 310 may perform a CGI measurement during an idle period.

Optionally, the SN can indicate a specific "cause" value in the modification request acknowledge message indicating the success of the procedure.

Optionally, the SN can determine whether SCG DRX is needed based on any of: the UE's measurement related capabilities, the indicated RAT type and frequency of CGI reporting target cell, and the RAT type and frequency of current serving cells in MCG and SCG. The RAT type may contain NR and/or E-UTRA.

In a failure case, in step 307, the SN 330 may send a modification request reject message to the MN including a failure cause. Optionally, upon reception of the message sent from MN, if the SN determines that it cannot generate the required SCG DRX, the SN can respond to MN by sending a reject message to MN, or by sending a response message including failure cause value to MN, the failure cause may include "unable to provide requested configuration." In step 308, the MN 320 may abort the CGI reporting measurement attempt.

Case 4

For a EN-DC UE, the MCG serving cells may operate on LTE frequencies, and the SCG serving cells may operate on NR FR1 frequencies. The UE may support a per-UE gap, but may not support per-FR gap, and the UE's ANR capability may indicate that it requires common idle period (not strictly aligned) to perform CGI reporting measurement.

The UE may have no on-going ANR CGI reporting measurement, and MN wants to configure a CGI reporting measurement to UE which the target cell is a NR FR1 cell. The MN may send SgNB Modification Request message to SN via X2 interface.

This message may contain an inter-node RRC message container CG-ConfigInfo.

Within CG-ConfigInfo, MN may include the MCG DRX configuration with long DRX cycle, in addition, MN may include the information of CGI reporting target cell by either indicating the frequency information such as Absolute Radio Frequency Channel Number (ARFCN) of target cell, or by indicating "NR FR1." In addition, MN may include the frequency of MCG serving cells, and parameter "DRX alignment indication" with value set to "Aligned."

Upon receiving SgNB Modification Request message including these parameters, the SN may determine that MN wants to trigger ANR measurement to UE on an NR FR1 cell. Based on UE's capability and the serving cells of MCG and SCG, the SN may determine that SN has to provide long DRX configuration to UE, to facilitate UE to do CGI reporting on target NR FR1 cell. The SCG DRX may be aligned with MCG DRX.

The SN may generate the SN RRCReconfiguration message including the corresponding SCG DRX configuration. The SN can send the RRCReconfiguration message to UE via SRB3 and respond to MN the SgNB Modification Request Acknowledge message. Alternatively, the SN can send SgNB Modification Request Acknowledge message to MN including the encoded SN RRCReconfiguration message. In addition, within SgNB Modification Request Acknowledge message, the SN can indicate the corresponding SCG DRX configuration in the CG-Config container.

After receiving the acknowledge message from SN, the MN may transmit the RRCConnectionReconfiguration message to UE, including ANR CGI reporting measurement configuration, MCG long DRX configuration, and SN RRCReconfiguration message container (if received from SN).

In some embodiments, the CG-ConfigInfo may include the inter-node RRC message included in SgNB Modification Request message sent from MN to SN. In some embodiments, CG-Config may include the inter-node RRC message included in SgNB Modification Request Acknowledge message sent from SN to MN.

Case 5

For a NR-DC UE, the MCG serving cells may operate on NR FR1 frequencies, and the SCG serving cells may operate on NR FR2 frequencies. The UE may support both per-UE gap and per-FR gap.

The UE may have no on-going ANR CGI reporting measurement, and MN may want to configure a CGI reporting measurement to UE which the target cell is a NR FR2 cell. The MN may send S-Node Modification Request message to SN via Xn interface.

This message may contain an inter-node RRC message container CG-ConfigInfo. Within CG-ConfigInfo, MN may include the configured MCG DRX configuration. In addition, MN may include the information of CGI reporting target cell by either indicating the frequency information such as Absolute Radio Frequency Channel Number (ARFCN) of target cell, or by indicating "NR FR2." In addition, MN may include the frequency of MCG serving cells.

Upon receiving S-Node Modification Request message including these parameters, the SN may know that MN wants to trigger ANR measurement to UE on a NR FR2 cell. Based on UE's capability and the serving cells of MCG and SCG, SN may determine that SN has to provide long DRX configuration to UE, to facilitate UE to do CGI reporting on target NR FR1 cell. The SCG DRX can be configured irrespective of the MCG DRX configuration.

The SN may generate the SN RRCReconfiguration message including the corresponding SCG DRX configuration. SN can send the RRCReconfiguration message to UE via SRB3 and responds to the MN the S-Node Modification Request Acknowledge message. Alternatively, the SN can send S-Node Modification Request Acknowledge message to MN by including the encoded SN RRCReconfiguration message. In addition, within S-Node Modification Request Acknowledge message, the SN can indicate the corresponding SCG DRX configuration in CG-Config container.

After receiving the acknowledge message from SN, MN may transmit the RRCReconfiguration message to UE, including the ANR CGI reporting measurement configuration, and SN RRCReconfiguration message container (if received from SN).

In some embodiments, the CG-ConfigInfo may include the inter-node RRC message included in S-Node Modification Request message sent from MN to SN. In some embodiments, the CG-Config may include the inter-node RRC message included in S-Node Modification Request Acknowledge message sent from SN to MN.

Example Embodiment 3

Figure 4:
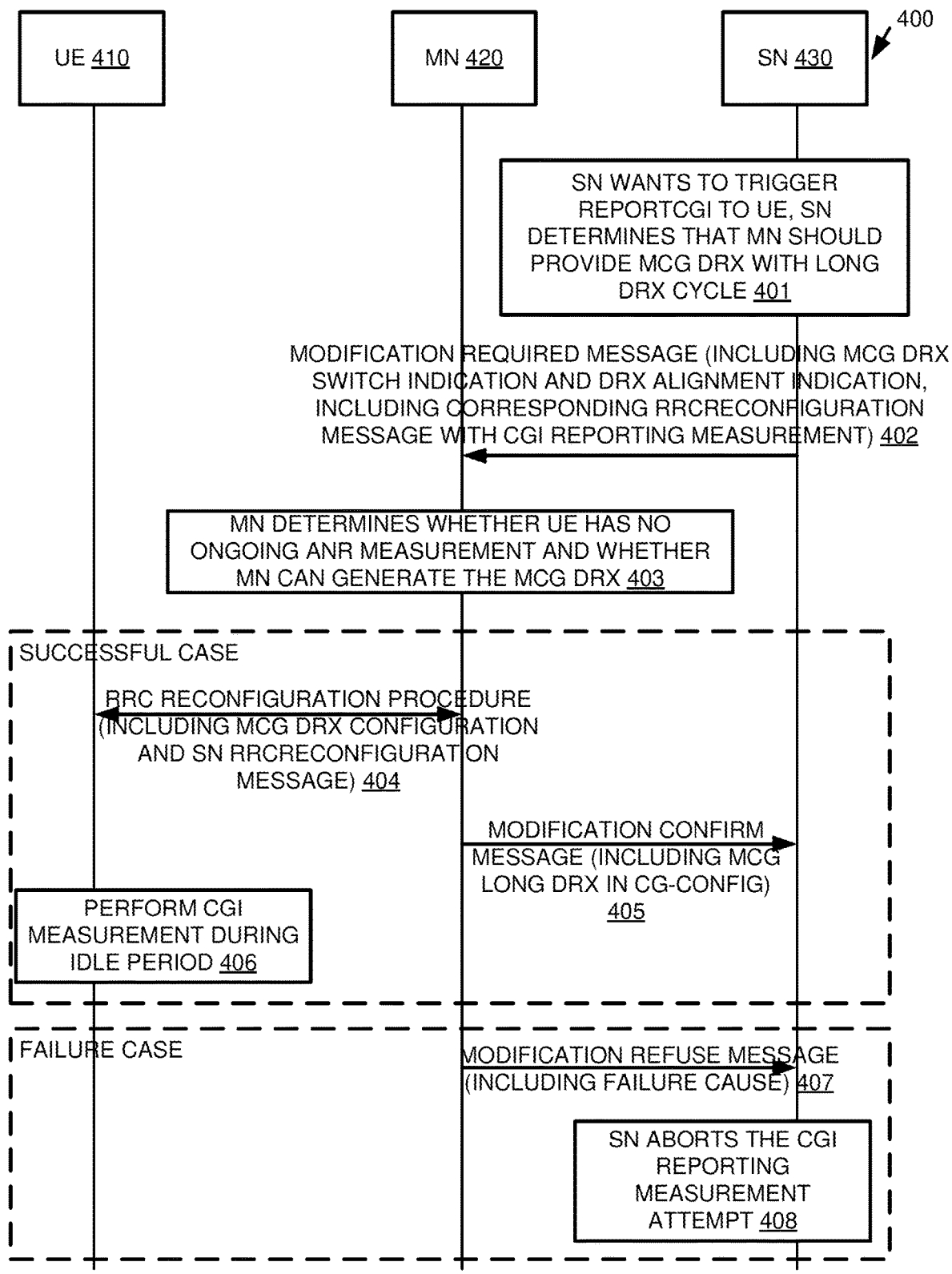
FIG. 4 illustrates an example signaling process to coordinate DRX between nodes, according to a third exemplary embodiment.

FIG. 4 illustrates an example signaling process 400 to coordinate DRX between nodes, according to a third exemplary embodiment. In step 401, the SN 430 may determine that the SN wants to trigger reportCGI to the UE, and the SN may determine that the MN should provide MCG DRX with long DRX cycle.

In step 402, the SN 430 may send a modification required message that includes MCG DRX switch indication and DRX alignment indication and including corresponding RRCReconfiguration message with CGI reporting measurement. If MCG long DRX is needed, the SN may send a message to MN that includes an MCG DRX switch indication providing an explicit indication to inform MN if MCG long DRX is required.

The modification required message may include a DRX alignment indication providing an explicit indication to inform MN about the DRX alignment requirement. The value range can be strictly aligned, aligned, or none. Strictly aligned may mean the MN configured DRX must be strictly aligned with SCG DRX. For example, they may have the same periodicity, and from UE perspective, the MCG DRX's 'On Duration' entirely contains the SCG DRX's 'On Duration' or vice versa. Aligned may mean the MN configured DRX may be aligned with SCG DRX. For example, they can have different periodicities and different length of DRX On Duration. But from UE perspective, MCG DRX and SCG DRX may provide sufficient common idle period. None may mean the MN can configure DRX configuration irrespective of the SCG DRX configuration. As long as the MCG DRX can provide sufficient idle period to UE.

The modification required message may include a timing difference between PSCell and PCell. The timing difference between PSCell and PCell may correspond to the SFN, frame timing difference between PSCell and PCell (or SFTD results).

Optionally, the above parameters can be indicated in UE specific inter-node RRC message container contained in the message transmitted from MN to SN.

In step 403, the MN 420 may determine whether the UE has no ongoing ANR measurement and whether MN can generate the MCG DRX. Upon reception of above message, if MN determines UE has no ongoing ANR measurement, and MN is capable of generating the MCG DRX, the MN may generate the corresponding MCG long DRX configuration, and responses to SN by sending a response message to SN.

In step 404, the UE 410 and MN 420 may initiate an RRCReconfiguration procedure to UE, the RRCReconfiguration message including MCG DRX configuration and SN RRCReconfiguration message. In step 405, the MN 420 may send a modification confirm message to the SN 430 including MCG long DRX in CG-Config message. In step 406, the UE 410 may perform a CGI measurement during an idle period.

Optionally, the MN can indicate specific "cause" value in the modification confirm message indicating the success of the procedure.

Optionally, SN may determine whether MCG DRX is needed based on the UE's measurement related capabilities, the RAT type and frequency of ANR measured target cell, and The RAT type and frequency of current serving cells in MCG and SCG. The RAT type may include any of NR, or E-UTRA, or GERAN, or UTRAN, or CDMA, and The RAT type and frequency of current serving cells in MCG and SCG.

Optionally, upon reception of the message sent from SN, if MN determines that it cannot generate the required MCG DRX, MN can respond to SN by sending a reject message to SN, or by sending a response message including failure cause value to SN.

Case 6

For a EN-DC UE, the MCG serving cells may operate on LTE frequencies, and the SCG serving cells may operate on NR FR1 frequencies. The UE may support per-UE gap, but may not support per-FR gap, and the UE's ANR capability may indicate a request for a common idle period (not strictly aligned) to perform CGI reporting measurement.

The SN may want to configure a CGI reporting measurement to UE which the target cell is a NR FR1 cell. Considering current serving cells are either LTE or NR FR1 frequencies, and UE may only support per-UE gap. The SN may determine that both MN and SN has to provide long DRX configuration to UE, to facilitate UE to do CGI reporting on target NR FR1 cell.

For an ANR coordination procedure, the SN may send SgNB Modification Required message to MN via X2 interface. This message may include an inter-node RRC message container so called CG-Config. Within CG-Config, SN may include the SCG DRX configuration with long DRX cycle, in addition, SN may include parameter "MCG DRX switch indication" with value set to "True," and includes parameter "DRX alignment indication" with value set to "Aligned." The SN may include timing difference result between PSCell and PCell in CG-Config. On the other hand, the SN may include the RRCReconfiguration message with corresponding CGI reporting configuration in CG-Config.

Upon receiving SgNB Modification Required message including these parameters, the MN may know that SN wants to trigger ANR measurement to UE, and MCG DRX with long DRX cycle may be required, and the configuration may be aligned with SCG DRX.

In case there is no on-going CGI reporting measurement configured by MN, the MN may generate the corresponding MCG DRX based on the received SCG DRX and timing difference results. MN may then send RRCConnectionReconfiguration message to UE, including MCG long DRX configuration, and SN RRCReconfiguration message container.

After receiving the RRCConnectionComplete message from UE, the MN may send SgNB Modification Confirm message to SN. In addition, within a SgNB Modification Confirm message, the MN can indicate the corresponding MCG DRX configuration in a CG-ConfigInfo container.

In some embodiments, CG-Config may be the inter-node RRC message included in SgNB Modification Required message sent from SN to MN. In some embodiments, CG-ConfigInfo may be the inter-node RRC message included in SgNB Modification Confirm message sent from MN to SN.

Case 7

For a NR-DC UE, the MCG serving cells may operate on NR FR1 frequencies, and the SCG serving cells may operate on NR FR2 frequencies. The UE may support both per-UE gap and per-FR gap.

The SN may want to configure a CGI reporting measurement to UE which the target cell is a NR FR1 cell. Considering the UE supports per-FR gap, which may indicate that the UE has independent RF chain for FR1 and FR2 transmission/reception. On the other hand, since MCG serving cells are on FR1 frequencies, so the SN may determine that only MN has to provide long DRX configuration to UE, to facilitate UE to do CGI reporting on target NR FR1 cell.

For ANR coordination procedure, SN may send SgNB Modification Required message to MN via X2 interface. This message may include an inter-node RRC message container so called CG-Config. Within CG-Config, SN may include the configured SCG DRX configuration. In addition, SN may include the parameter "MCG DRX switch indication" with value set to "True," and includes parameter "DRX alignment indication" with value set to "None." The SN may include a timing difference result between PSCell and PCell in CG-Config. On the other hand, the SN may include the RRCReconfiguration message with corresponding CGI reporting configuration in CG-Config.

Upon receiving SgNB Modification Required message including these parameters, the MN may know that SN wants to trigger ANR measurement to UE, and MCG DRX with long DRX cycle is required, and the configuration can be provided irrespective of the SCG DRX.

In case there is no on-going CGI reporting measurement configured by MN. The MN may generate the corresponding MCG DRX configuration. MN may send a RRCConnectionReconfiguration message to UE, which may include MCG long DRX configuration, and SN RRCReconfiguration message container.

After receiving the RRCConnectionComplete message from UE, the MN may send SgNB Modification Confirm message to SN. In addition, within a SgNB Modification Confirm message, the MN can indicate the corresponding MCG DRX configuration in CG-ConfigInfo container.

In some embodiments, CG-Config may be the inter-node RRC message included in SgNB Modification Required message sent from SN to MN, and CG-ConfigInfo may be the inter-node RRC message included in SgNB Modification Confirm message sent from MN to SN.

Example Embodiment 4

When UE receives CGI reporting measurement configuration, UE may start a timer, and try to search/read the system information of target cell. UE may send a CGI measurement report to network when UE successfully obtains the CGI information, or timer expiry, or failure happens (e.g. target cell does not broadcast CGI information). After UE sends measurement report to network (UE will send CGI measurement report to the node which configures the CGI reporting measurement). The received node may inform the other node to reconfigure/release the long DRX if configured.

Figure 5:
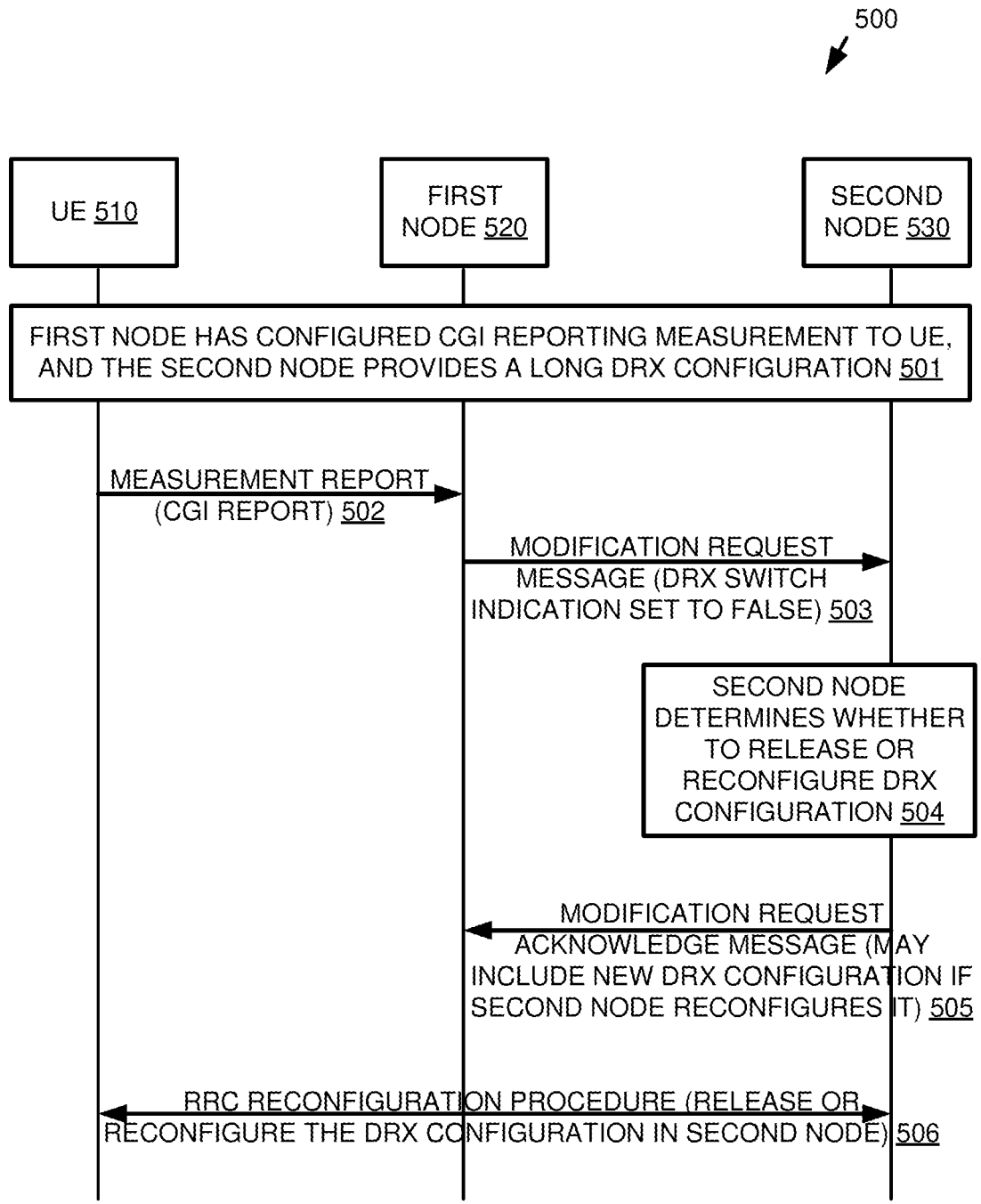
FIG. 5 illustrates an example signaling process to coordinate DRX between nodes, according to a fourth exemplary embodiment.

FIG. 5 illustrates an example signaling process 500 to coordinate DRX between nodes, according to a fourth exemplary embodiment. In step 501, the first node may have configured a CGI reporting measurement to the UE 510, and the second node 530 may provide a long DRX configuration. In step 502, the UE 510 may send a measurement report (CGI report) to the first node 520. In step 503, first node 520 may send a modification request message (DRX switch indication set to false) to the second node 530.

For a dual connectivity UE which is connected to first node and second node. In the case where the first node configures an ANR CGI reporting measurement to UE, and second node may provide a long DRX configuration to UE. After the first node receives the CGI measurement report from UE, the first node may send a message to the second node, to inform the second node to release or reconfigure the DRX configuration. This message may include an explicit indication which is used to inform the second node that long DRX for ANR purpose is not needed any more or an explicit indication which is used to inform the second node that ANR measurement stops.

Upon reception of above message, the second node can release the DRX configuration, or reconfigure the DRX with smaller DRX cycle. Then the second node may respond to SN by sending a response message to MN.

Optionally, it may be up to second node whether to release or reconfigure the DRX configuration.

In step 504, the second node 530 may determine whether to release or reconfigure DRX configuration. In step 505, the second node 530 may send a modification request acknowledge message to the 520 including a new DRX configuration if the second node reconfigures it. In step 506, the UE and second node may initiate an RRC Reconfiguration procedure including a release or reconfigure the DRX configuration in the second node.

Case 8

For a NR-DC UE, MN may configure a CGI reporting measurement to UE, and SN may already provide SCG DRX with long DRX cycle to facilitate UE to do the measurement.

The UE may successfully obtain the CGI information of target cell and transmit the CGI measurement report to MN before timer expires. Upon the reception of this measurement report, the MN may send a SgNB Modification Request message to SN via X2 interface. This message may contain an inter-node RRC message container so called CG-ConfigInfo. Within CG-ConfigInfo, MN may set the DRX switch indication to "False," in order to inform SN that CGI reporting measurement procedure ends up, that SN can release or reconfigure the SCG DRX configuration.

Upon reception of SgNB Modification Request message, the SN may decide to reconfigure the DRX with smaller DRX cycle and respond to MN by sending SgNB Modification Request Acknowledge message to MN. In addition, SN can indicate the new DRX configuration in SgNB Modification Request Acknowledge message.

Example Embodiment 5

Figure 6:
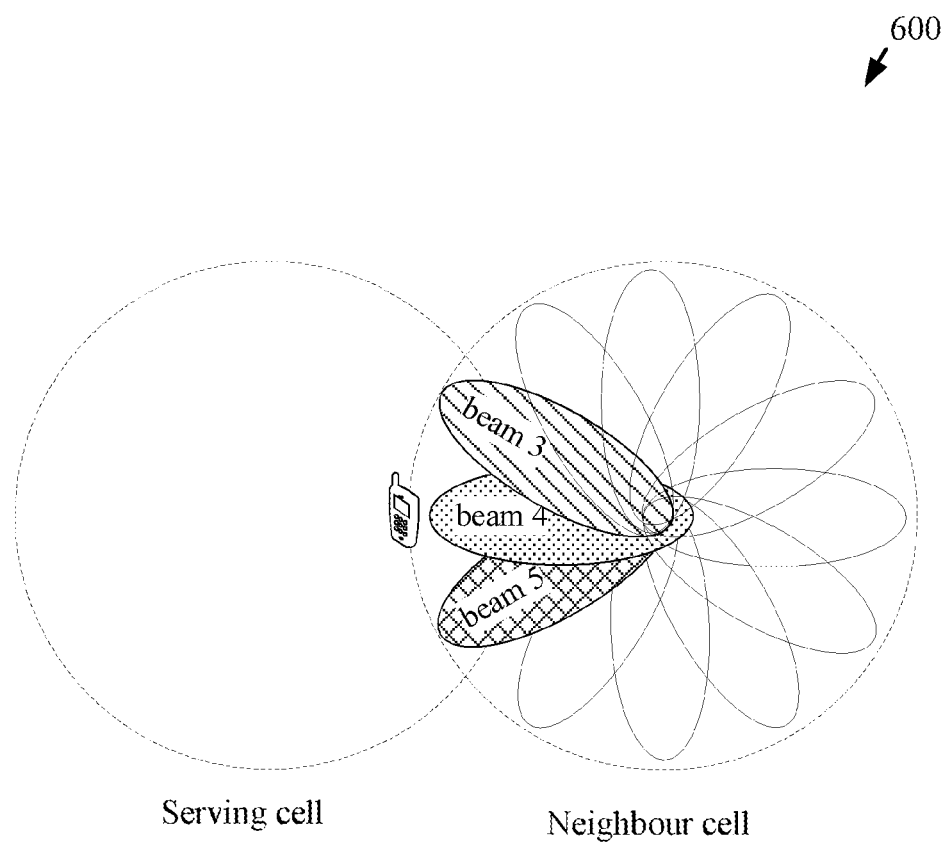
FIG. 6 illustrates an example block diagram illustrating SSB indexes in a CGI measurement report.

FIG. 6 illustrates an example block diagram 600 illustrating SSB indexes in a CGI measurement report. For a UE configured with CGI reporting measurement on a NR target cell, when UE sends CGI measurement report to network, the UE can indicate best detected SSB beam indexes or more than one strongest detected beam indexes of the target cell in the measurement report. The above UE can be a NR UE, a LTE UE, or a MR-DC UE.

Optionally, the UE can indicate the SSB indexes when network enable the function switch in CGI reporting measurement configuration.

Optionally, network can configure the maximum number of report SSB indexes in CGI reporting measurement configuration. UE may report the best detected SSB index and up to "maximum number-1" detected SSB indexes.

Optionally, UE may determine the sort of SSB index based on RSRP quality of each beam.

Optionally, the UE can indicate whether it supports SSB indexes reporting in UE's radio capability, and send it to network.

Case 9

A NR UE may be capable of reporting detected SSB index in CGI measurement report. The network may configure the UE to perform CGI reporting on a NR target cell. Within the measurement configuration, the network may indicate that UE shall report SSB index together with CGI reporting by setting a function indication to "True." Meanwhile, the network may set the maximum number of report SSB indexes to 1.

Upon receiving the measurement configuration, the UE may start to search the SSB of target NR cell. Finally, UE may successfully detect SSB index=3, 4, 5, and SSB index 4 has the highest RSRP quality. The UE may decode the corresponding system information (SIB1) to obtain the CGI information. After obtaining the CGI information, UE may send CGI measurement report to network. Within the measurement report, UE may include SSB index 4 together with the CGI information of target cell.

Figure 7:
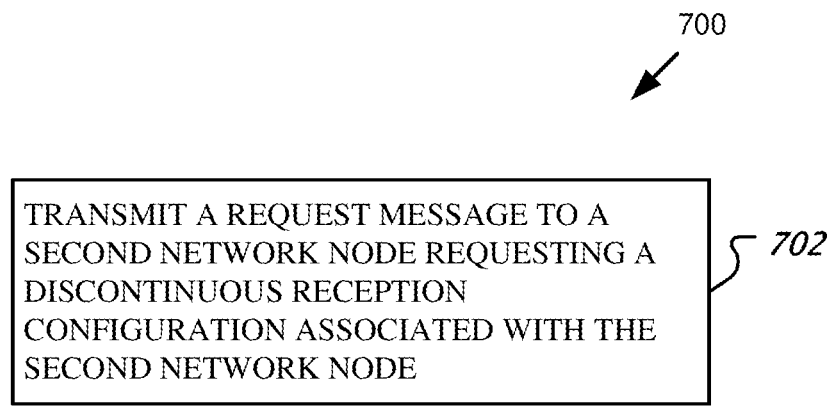
FIG. 7 illustrates a block diagram of an example method for coordinating DRX for ANR.

FIG. 7 illustrates a block diagram 700 of a method to coordinate DRX for ANR. The method 700 may include a first network node transmitting a request message to a second network node requesting a discontinuous reception configuration associated with the second network node (block 702).

The first network node can include any of a MN or SN, as described in the present embodiments. The second network node can include any of the MN or SN, as described in the present embodiments. The request message can include the modification request message 102, 302, 503 as described in Example Embodiment 1, Example Embodiment 2, or Example Embodiment 4. The request message can include the modification required message 402 as described in Example Embodiment 3. The discontinuous reception configuration associated with the second network node can include SCG DRX, as described in the present embodiments.

In some embodiments, the request message includes a first indicator relating to a discontinuous reception switching mode associated with the second network node.

In some embodiments, the request message includes a second indicator relating to an alignment of the discontinuous reception configuration associated with the second network node and a discontinuous reception configuration associated with the first network node.

In some embodiments, the request message includes a timing difference including a system frame number and a frame difference between a primary cell of a primary group of cells and a primary cell of a secondary group of cells.

In some embodiments, the method includes determining, by the first network node, that the first network node is to request the discontinuous reception configuration associated with the second network node from the second network node.

In some embodiments, the discontinuous reception configuration associated with the second network node includes a long discontinuous reception cycle.

In some embodiments, the second indicator indicates that the discontinuous reception configuration associated with the second network node is strictly aligned with the discontinuous reception associated with the first network node, indicating that a cycle length of the discontinuous reception configuration associated with the second network node matches a cycle length of the discontinuous reception associated with the first network node and a period of an on duration of the discontinuous reception configuration associated with the second network node is included within a period of an on duration of the discontinuous reception associated with the first network node.

In some embodiments, the second indicator indicates that the discontinuous reception configuration associated with the second network node is aligned with the discontinuous reception associated with the first network node indicating that a long common idle period is provided between the discontinuous reception configuration associated with the second network node and the discontinuous reception associated with the first network node.

In some embodiments, the second indicator indicates that the discontinuous reception configuration configured by the second network node includes no alignment with a discontinuous reception associated with a primary group of cells.

In some embodiments, the second network node is configured to determine whether the second network node is capable of generating the discontinuous reception configuration associated with the second network node.

In another embodiment, a method for wireless communication comprises transmitting, by a first network node, a request message to a second network node, the request message indicating a request to trigger a global cell identification report of a terminal and including information relating to a target cell used for measuring the global cell identification report.

In some embodiments, the method includes determining, by the first network node, that the first network node is to trigger the global cell identification report of the terminal.

In some embodiments, the information relating to the target cell includes a frequency of a target cell.

In some embodiments, the information relating to the target cell includes synchronization signal block (SSB) measurement timing control information of the target cell.

In some embodiments, the information relating to the target cell includes a radio access technology (RAT) indication of the target cell.

In some embodiments, the RAT indication of the target cell includes any of a global system for mobile communications (GSM) enhanced data rates for GSM evolution (EDGE) radio access network (GERAN), a universal terrestrial radio access network (UTRAN), code division multiple access (CDMA), a new radio first frequency range (NR FR1), and a new radio second frequency range (NR FR2).

In some embodiments, the request message includes information identifying a discontinuous reception alignment indicator.

In some embodiments, the second network node to determine whether the second network node is capable of generating a discontinuous reception configuration associated with a second network node.

In some embodiments, the method includes receiving, by the first network node, a response message from the second network node, the response message including the discontinuous reception configuration associated with the second network node and a corresponding radio resource control (RRC) reconfiguration message based on the second node determining that the second network node is capable of generating the discontinuous reception configuration associated with the second network node.

In some embodiments, the method includes receiving, by the first network node, a rejection message from the second network node, the rejection message indicating a failure cause representing that the second network node is not capable of generating the discontinuous reception configuration associated with the second network node.

In some embodiments, the method includes aborting, by the first network node, a global cell identification report measurement attempt based on receiving the rejection message from the second network node.

In another embodiment, A method for wireless communication comprises receiving, by a first network node, a measurement report from a terminal including a global cell identifier report. The method may also include transmitting, by the first network node, a request message to a second network node that includes a discontinuous reception switch indicator that is set to a false value indicating that a discontinuous reception configuration associated with the second network node is not needed based on receiving the measurement report from the terminal.

In some embodiments, the second network node is configured to determine to any of release or modify the discontinuous reception configuration associated with the second network node based on receiving the request message.

Figure 8:
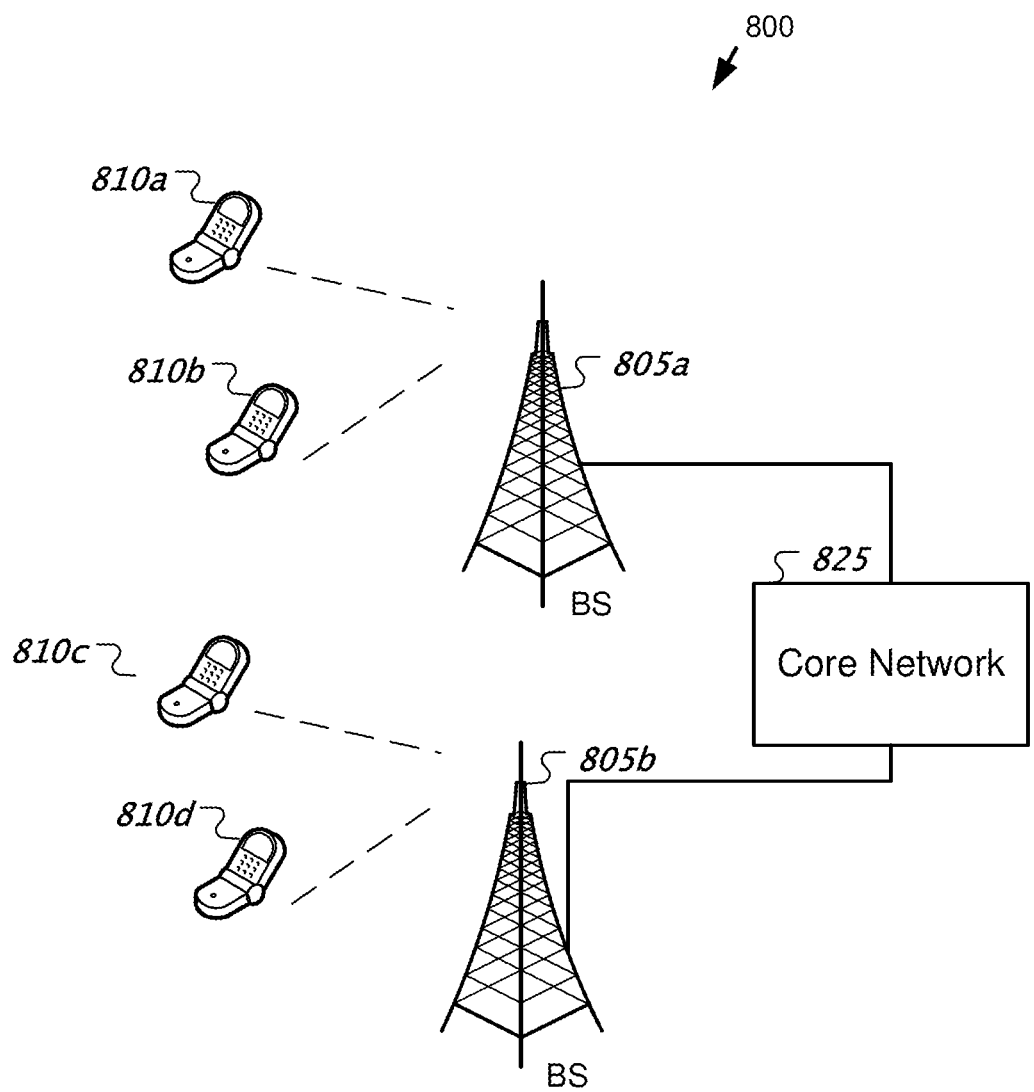
FIG. 8 shows an example of a wireless communication system where techniques in accordance with one or more embodiments of the present technology can be applied.

FIG. 8 shows an example of a wireless communication system where techniques in accordance with one or more embodiments of the present technology can be applied. A wireless communication system 800 can include one or more base stations (BSs) 805a, 805b, one or more wireless devices 810a, 810b, 810c, 810d, and a core network 825. A base station 805a, 805b can provide wireless service to wireless devices 810a, 810b, 810c and 810d in one or more wireless sectors. In some implementations, a base station 805a, 805b includes directional antennas to produce two or more directional beams to provide wireless coverage in different sectors.

The core network 825 can communicate with one or more base stations 805a, 805b. The core network 825 provides connectivity with other wireless communication systems and wired communication systems. The core network may include one or more service subscription databases to store information related to the subscribed wireless devices 810a, 810b, 810c, and 810d. A first base station 805a can provide wireless service based on a first radio access technology, whereas a second base station 805b can provide wireless service based on a second radio access technology. The base stations 805a and 805b may be co-located or may be separately installed in the field according to the deployment scenario. The wireless devices 810a, 810b, 810c, and 810d can support multiple different radio access technologies. In some embodiments, the base stations 805a, 805b may be configured to implement some techniques described in the present document. The wireless devices 810a to 810d may be configured to implement some techniques described in the present document.

In some implementations, a wireless communication system can include multiple networks using different wireless technologies. A dual-mode or multi-mode wireless device includes two or more wireless technologies that could be used to connect to different wireless networks.

Figure 9:
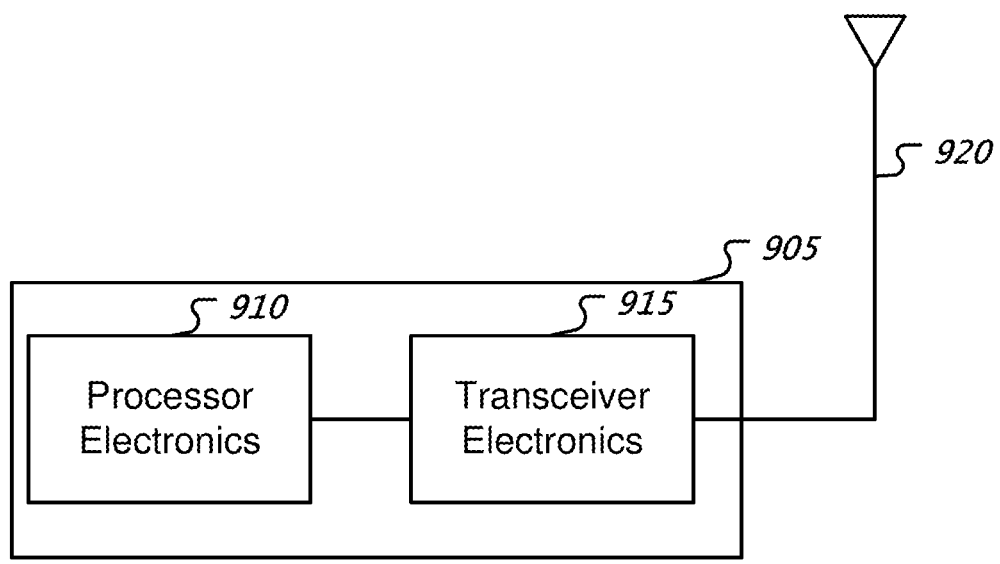
FIG. 9 is a block diagram representation of a portion of a hardware platform.

FIG. 9 is a block diagram representation of a portion of a hardware platform. A hardware platform 905 such as a network device or a base station or a wireless device (or UE) can include processor electronics 910 such as a microprocessor that implements one or more of the techniques presented in this document. The hardware platform 905 can include transceiver electronics 915 to send and/or receive wired or wireless signals over one or more communication interfaces such as antenna 920 or a wireline interface. The hardware platform 905 can implement other communication interfaces with defined protocols for transmitting and receiving data. The hardware platform 905 can include one or more memories (not explicitly shown) configured to store information such as data and/or instructions. In some implementations, the processor electronics 910 can include at least a portion of the transceiver electronics 915. In some embodiments, at least some of the disclosed techniques, modules or functions and network nodes are implemented using the hardware platform 905.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
    transmitting, by a first network node upon triggering a global cell identification report by a terminal that requires aligned discontinuous reception (DRX) configurations between the first network node and a second network node, a request message to the second network node,
    the request message comprising an indicator that requests an alignment of a DRX configuration associated with the second network node and a DRX configuration associated with the first network node such that a cycle length of the DRX configuration associated with the second network node matches a cycle length of the DRX configuration associated with the first network node and an on-duration of the DRX configuration associated with the first network node is greater than, and entirely contains, an on-duration of the DRX configuration associated with the second network node.

2. The method of claim 1, wherein the cycle length of the DRX configuration associated with the second network node is a DRX long cycle.

3. The method of claim 1, wherein the first network node is a master node and the second network node is a secondary node in a network.

4. The method of claim 1, wherein the request message is an inter-node Radio Resource Configuration (RRC) message container CG-ConfigInfo.

5. An apparatus for wireless communication implemented as a first network node, comprising a processor that is configured to:
    transmit, upon triggering a global cell identification report by a terminal that requires aligned discontinuous reception (DRX) configurations between the first network node and a second network node, a request message to the second network node, the request message comprising an indicator that requests an alignment of a DRX configuration associated with the second network node and a DRX configuration associated with the first network node such that a cycle length of the DRX configuration associated with the second network node matches a cycle length of the DRX configuration associated with the first network node and an on-duration of the DRX configuration associated with the first network node is greater than, and entirely contains, an on-duration of the DRX configuration associated with the second network node.

6. The apparatus of claim 5, wherein the cycle length of the DRX configuration associated with the second network node is a DRX long cycle.

7. The apparatus of claim 5, wherein the first network node is a master node and the second network node is a secondary node in a network.

8. The apparatus of claim 5, wherein the request message comprises an inter-node Radio Resource Configuration (RRC) message container CG-ConfigInfo.

9. An apparatus for wireless communication implemented as a second network node, comprising a processor that is configured to:
receive a request message from a first network node upon the first network node triggering a global cell identification report by a terminal that requires aligned discontinuous reception (DRX (configurations between the first network node and a second network node, the request message comprising an indicator that requests an alignment of a DRX configuration associated with the second network node and a DRX configuration associated with the first network node such that a cycle length of the DRX configuration associated with the second network node matches a cycle length of the DRX configuration associated with the first network node and an on-duration of the DRX configuration associated with the first network node is greater than, and entirely contains, an on-duration of the DRX configuration associated with the second network node.

10. The apparatus of claim 9, wherein the cycle length of the DRX configuration associated with the second network node is a DRX long cycle.

11. The apparatus of claim 9, wherein the processor is further configured to:
modify the DRX configuration based on the request message.

12. The apparatus of claim 9, wherein the first network node is a master node and the second network node is a secondary node.

13. The apparatus of claim 9, wherein the request message comprises an inter-node Radio Resource Configuration (RRC) message container CG-ConfigInfo.

14. A method for wireless communication, comprising:
receiving, by a second network node, a request message from a first network node upon the first network node triggering a global cell identification report by a terminal that requires aligned discontinuous reception (DRX) configurations between the first network node and the second network node,
the request message comprising an indicator that requests an alignment of a DRX configuration associated with the second network node and a DRX configuration associated with the first network node such that a cycle length of the DRX configuration associated with the second network node matches a cycle length of the DRX configuration associated with the first network node and an on-duration of the DRX configuration associated with the first network node is greater than, and entirely contains, an on-duration of the DRX configuration associated with the second network node.

15. The method of claim 14, wherein the cycle length of the DRX configuration associated with the second network node is a DRX long cycle.

16. The method of claim 14, comprising:
modifying the DRX configuration based on the request message.

17. The method of claim 14, wherein the first network node is a master node and the second network node is a secondary node.

18. The method of claim 14, wherein the request message comprises an inter-node Radio Resource Configuration (RRC) message container CG-ConfigInfo.

* * * * *